United States Patent [19]

Racicot

[11] Patent Number: 5,294,187

[45] Date of Patent: Mar. 15, 1994

[54] WHEEL USABLE ON GROUND, WATER, AND SNOW

[76] Inventor: Gérald Racicot, 5521, rue St Joseph, Valcourt, Québec, Canada, J0E 2L0

[21] Appl. No.: 938,068

[22] Filed: Aug. 31, 1992

[51] Int. Cl.$^5$ .............................................. B60B 19/06
[52] U.S. Cl. ....................................... 301/5.1; 301/1; 180/7.1; 440/100
[58] Field of Search ...................... 301/1, 5.1; 305/60; 180/7.1, 7.2, 21; 440/98, 100

[56] References Cited

U.S. PATENT DOCUMENTS

| | | | |
|---|---|---|---|
| 2,488,310 | 11/1949 | Mayer | 440/100 |
| 2,812,031 | 11/1957 | Aghnides | 301/5.1 X |
| 3,251,430 | 5/1966 | Veryzer | 180/7.1 X |
| 4,379,701 | 4/1983 | David | 440/100 X |

FOREIGN PATENT DOCUMENTS 0306388 3/1989 European Pat. Off. ............ 440/100

Primary Examiner—Russell D. Stormer
Attorney, Agent, or Firm—Quarles & Brady

[57] ABSTRACT

A hollow wheel is rotatively mounted on a vehicle about an axis of rotation defining an acute angle with the vertical. This wheel comprises a first convex side wall having an outer face defining a circular and axially tapering tread centered on the axis of rotation, and a second side wall spaced apart from and connected to the first side wall to form the hollow wheel. A tube, centered on the axis of rotation, interconnects the first and second side walls to receive an axle. The tread is generally conical and presents a convex cross section. Preferably, the interconnected first and second side walls form a water-tight hollow body presenting buoyancy. The hollow wheel can be used on ground, water and snow.

14 Claims, 3 Drawing Sheets

WHEEL USABLE ON GROUND, WATER, AND SNOW

FIELD OF THE INVENTION

The present invention relates to a new design enabling a wheel to operate satisfactorily on ground, water and snow.

SUMMARY OF THE INVENTION

In accordance with the present invention, there is provided a wheel to be rotatively mounted on a movable object about an axis of rotation defining an acute angle with the vertical, comprising:

first and second opposite side faces of which one is convex and defines a circular and axially tapering tread centered on the axis of rotation; and means for rotatively mounting the wheel on the movable object about the axis of rotation where the tread is capable of engaging a wheel-supporting surface.

In accordance with another aspect of the present invention, there is provided a hollow wheel to be rotatively mounted on a movable object about an axis of rotation defining an acute angle with the vertical, comprising:

a first convex side wall having an outer face defining a circular and axially tapering tread centered on the axis of rotation;

a second side wall spaced apart from and connected to the first side wall to form the hollow wheel; and means for rotatively mounting the wheel on the movable object about the axis of rotation where the tread is capable of engaging a wheel-supporting surface.

According to preferred embodiments of the instant invention, the tread is generally conical, and presents a convex cross section;

the interconnected first and second side walls form a water-tight body presenting buoyancy;

the hollow wheel is made of molded plastic material;

the wheel comprises a plane of symmetry, and the first and second side walls are interconnected through a peripheral edge located in this plane of symmetry;

the second side wall is also formed with a circular and axially tapering tread symmetrical with the tread of the first side wall about the plane of symmetry;

the rotatively mounting means comprises a tube interconnecting the first and second side walls and centered on the axis of rotation to receive an axle; and the acute angle, between the axis of rotation and the vertical, is situated between 0° and 50°.

As the wheel of the invention has a non horizontal axis of rotation and a convex side face forming a tread, the area resting on the wheelsupporting surface is increased whereby the wheel can be used on snow and also on water if it is hollow and buoyant.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 1:
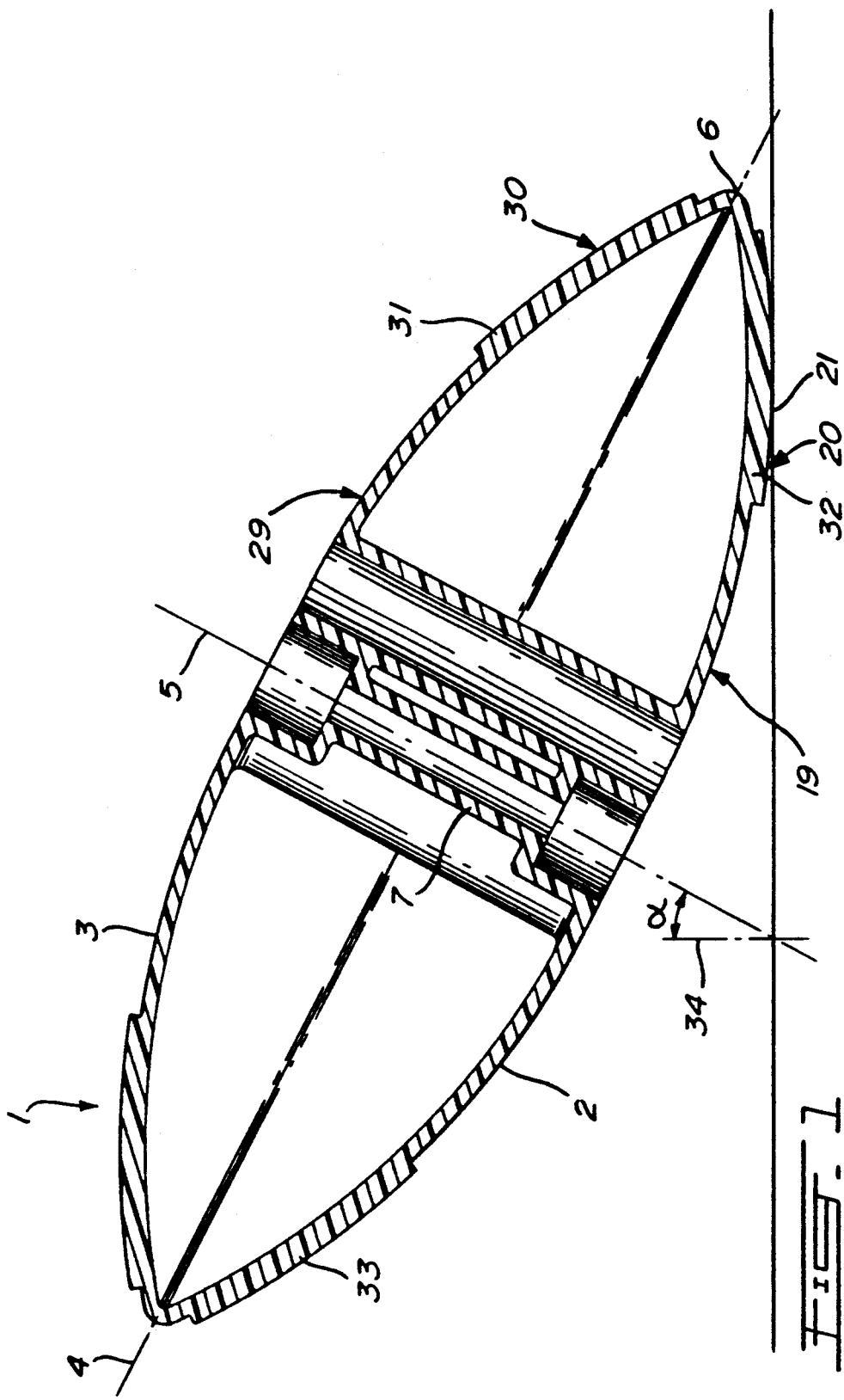
FIG. 1 is a cross sectional, front elevational view of a wheel in accordance with the present invention.
Figure 2:
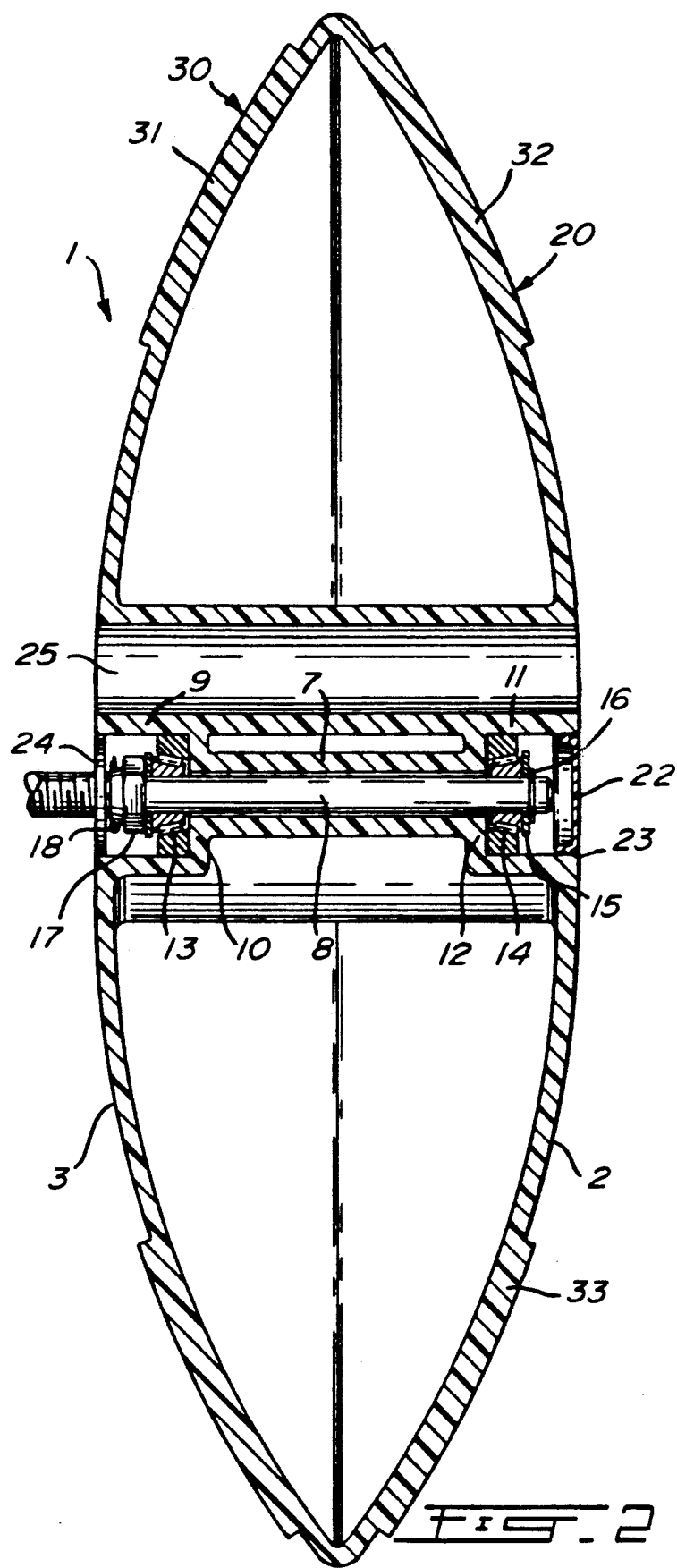
FIG. 2 is another cross sectional front view of the wheel of FIG. 1, showing the axle on which it is rotatively mounted.
Figure 3:
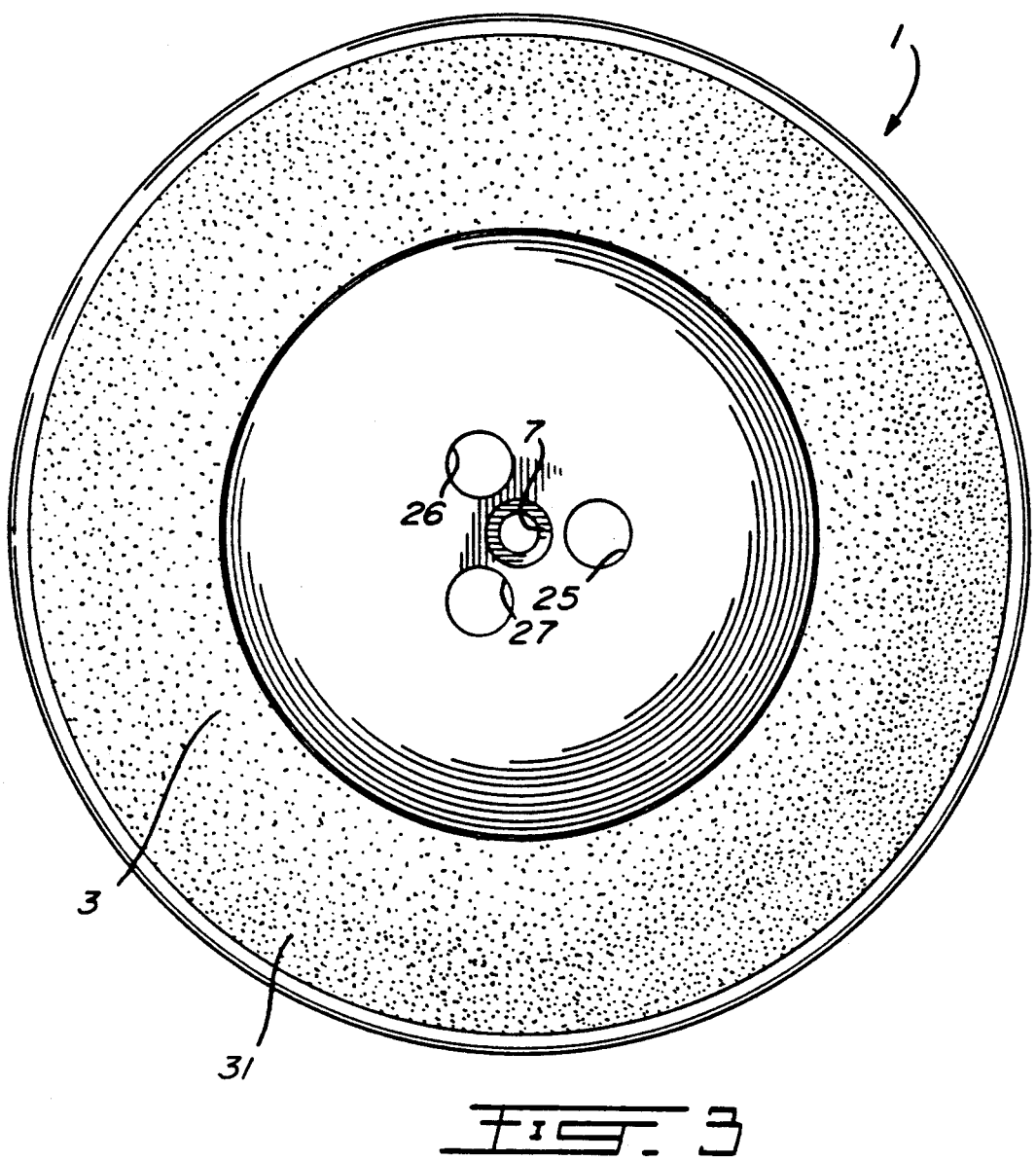
FIG. 3 is a side view of the wheel of FIGS. 1 and 2.

The wheel in accordance with the present invention, generally identified by the reference 1 in the accompanying FIGS. 1, 2 and 3, is hollow and preferably made of molded plastic material such as polyethylene, although other materials can also be contemplated.

The hollow wheel 1 is formed of first and second, opposite convex side walls 2 and 3 (FIGS. 1 and 2) symmetrical with respect to a plane of symmetry 4 perpendicular to the axis of rotation 5 of the wheel. As illustrated in FIG. 1, the axis of rotation 5 of the wheel 1 defines an acute angle $a$, that can vary between 0° and 50°, with the vertical when it is mounted on a vehicle or other movable object. Of course, the angle $a$ vary with the intended application and the specific profile of the wheel 1.

The convex side walls 2 and 3 are interconnected through a circular, peripheral edge 6 located in the plane of symmetry 4. The side walls 2 and 3 are also interconnected through a central and cylindrical tube 7 centered on the axis of rotation 5 to receive an axle 8 (FIG. 2). The cylindrical tube 7 comprises a first end 9 of larger diameter defining a shoulder 10 and a second end 11 of larger diameter defining another shoulder 12. The ends 9 and 11 along with the shoulders 10 and 12 allow conventional installation of the wheel 1 on the axle 8 through ball or needle bearings 13 and 14, washer 15 and snap ring 16, and crenelated nut 17 and cutter pin 18. These pieces are well known to those skilled in the art and will not be further described in the present specification. Of course the orientation of the axle 8 corresponds to the angle $a$ of FIG. 1.

A circular plastic cap 22 (FIG. 2) is fitted in the tube end 11 to prevent dirt from reaching the bearing 14. A barbed flange 23 will hold the cap 22 in place. In the same manner, an oil seal 24 is placed in the tube end 9, this seal 24 enabling passage and rotation of the axle 8.

The outer face 19 of the side wall 2 defines a circular and axially tapering tread 20 centered on the axis of rotation 5. As shown in FIG. 1, the tread 20 can of course be formed with any suitable pattern 21. The angle $a$ and the profile of the side walls 2 and 3 are of course selected to allow the tread 20 to engage the wheel-supporting surface (ground, water, snow, etc.). As illustrated in FIGS. 1 and 2, the tapering tread 20 is generally conical, but has a convex cross section.

The outer face 29 of the side wall 3 also defines a circular and axially tapering tread 30 centered on the axis of rotation 5. The tread 30 is symmetrical with the tread 20 with respect to the plane 4, whereby this tread 30 is also generally conical but with a convex cross section. Again, as shown in FIG. 1, the tread 30 can be formed with any suitable pattern 31 (FIGS. 1-3).

As wheel 1 is symmetrical with respect to plane 4, it can be turned over for example when tread 20 is worn out. Tread 30 would then engage the wheel-supporting surface (ground, water, snow, etc.).

FIGS. 2 and 3 illustrate a wheel 1 that further comprises three cylindrical tubes 25, 26 and 27 interconnecting the side walls 2 and 3. The tubes 25-27 are parallel to the axis of rotation 5 and are spaced apart with respect to each other by 120° around the central tube 7.

The latter three tubes reinforce the wheel structure and will enable eventual engagement of the wheel with a driving mechanism (not shown).

As can be appreciated, the wheel structure described in the foregoing description forms a hollow water-tight body presenting buoyancy.

Therefore, the wheel 1 in accordance with the subject invention comprises a convex side wall 2 of which the outer face 19 defines an axially tapering tread 20, and an axis of rotation oriented with an angle $\alpha$ with respect to the vertical to enable the tread 20 to engage the wheel-supporting surface. The area of the wheel 1 resting on the wheel-supporting surface is larger whereby floatation is increased and the wheel 1 can be used on snow. As the wheel 1 is buoyant, it can also be used on water.

An important aspect of the wheel 1 according to the invention is that it can be used in combination with a mechanism (not shown) for pivoting the axle 8 in a same vertical plane and thereby modifying the angle $\alpha$. When the wheel 1 is driven to propel a vehicle, portion 32 of the tread 20 (FIG. 1) engages the ground. In order to reverse the direction of movement of the vehicle, the axle 8 (FIG. 2) is simply pivoted on the vehicle until the acute angle with respect to the vertical is $-\alpha$ and portion 33 of the tread 20 engages the ground. When the angle $\alpha=0$, the vehicle is not propelled as the forward or rearward driving forces produced by friction of the wheel 1 on the wheel-supporting surface cancel.

Although the present invention has been described hereinabove by way of a preferred embodiment thereof, this embodiment can be modified at will, within the scope of the appended claims, without departing from the spirit and nature of the present invention.

The embodiments of the invention in which an exclusive property or privilege is claimed are defined as follows:

1. A wheel to be rotatively mounted on a movable object about an axis of rotation defining an acute angle with the vertical, comprising:
   a plane of symmetry;
   first and second opposite side faces symmetrical with respect to said plane of symmetry, said first and second side faces being both convex and defining respective circular and axially tapering treads centered on said axis of rotation and symmetrical with respect to said plane of symmetry; and
   means for rotatively mounting said wheel on the movable object about said axis of rotation where one of said treads is capable of engaging a wheel-supporting surface.

2. A wheel as recited in claim 1, wherein each of said treads has a convex cross section.

3. A wheel as recited in claim 1, wherein said wheel is hollow and presets buoyancy.

4. A wheel as recited in claim 3, in which said hollow wheel is made of molded plastic material.

5. A wheel as recited in claim 1, wherein said acute angle is situated between 0° and 50°.

6. A hollow wheel to be rotatively mounted on a movable object about an axis of rotation defining an acute angle with the vertical, comprising:
   a first convex side wall having an outer face defining a circular and axially tapering tread centered on said axis of rotation;
   a second side wall spaced apart from and connected to said first side wall to form said hollow wheel; and
   means for rotatively mounting said wheel on the movable abject about said axis of rotation where said tread is capable of engaging a wheel-supporting surface; p1 wherein said wheel comprises a plane of symmetry, and wherein said first and second side walls are interconnected through a peripheral edge of said wheel located in said plane of symmetry.

7. A hollow wheel as recited in claim 6, wherein said tread has a convex cross section.

8. A hollow wheel as recited in claim 6, in which the interconnected first and second side walls form a water-tight body presenting buoyancy.

9. A hollow wheel as recited in claim 8, wherein said water-tight body is made of molded plastic material.

10. A hollow wheel as recited in claim 6, in which said rotatively mounting means comprises a tube interconnecting said first and second side walls and centered on said axis of rotation to receive an axle.

11. A hollow wheel as recited in claim 6, further comprising a plurality of tubes interconnecting said first and second side walls.

12. A hollow wheel as recited in claim 11, wherein said tubes are parallel to said axis of rotation.

13. A hollow wheel as recited in claim 6, in which said acute angle is located between 0° and 50°.

14. A hollow wheel to be rotatively mounted on a movable object about an axis of rotation defining an acute angle with the vertical, comprising:
   a plane of symmetry;
   a first convex side wall having an outer face defining a first circular and axially tapering treads centered on said axis of rotation;
   a second convex aide wall spaced apart from and connected to said first side wall to form said hollow wheel, said second side wall being symmetrical with said first side wall with respect to said plane of symmetry, and said second side wall having an outer face defining a second circular and axially tapering tread centered on said axis of rotation and symmetrical with the first tread with respect to said plane of symmetry; and
   means for rotatively mounting said wheel on the movable object about said axis of rotation where one of said first and second treads is capable of engaging a wheel-supporting surface.

* * * * *